UNITED STATES PATENT OFFICE.

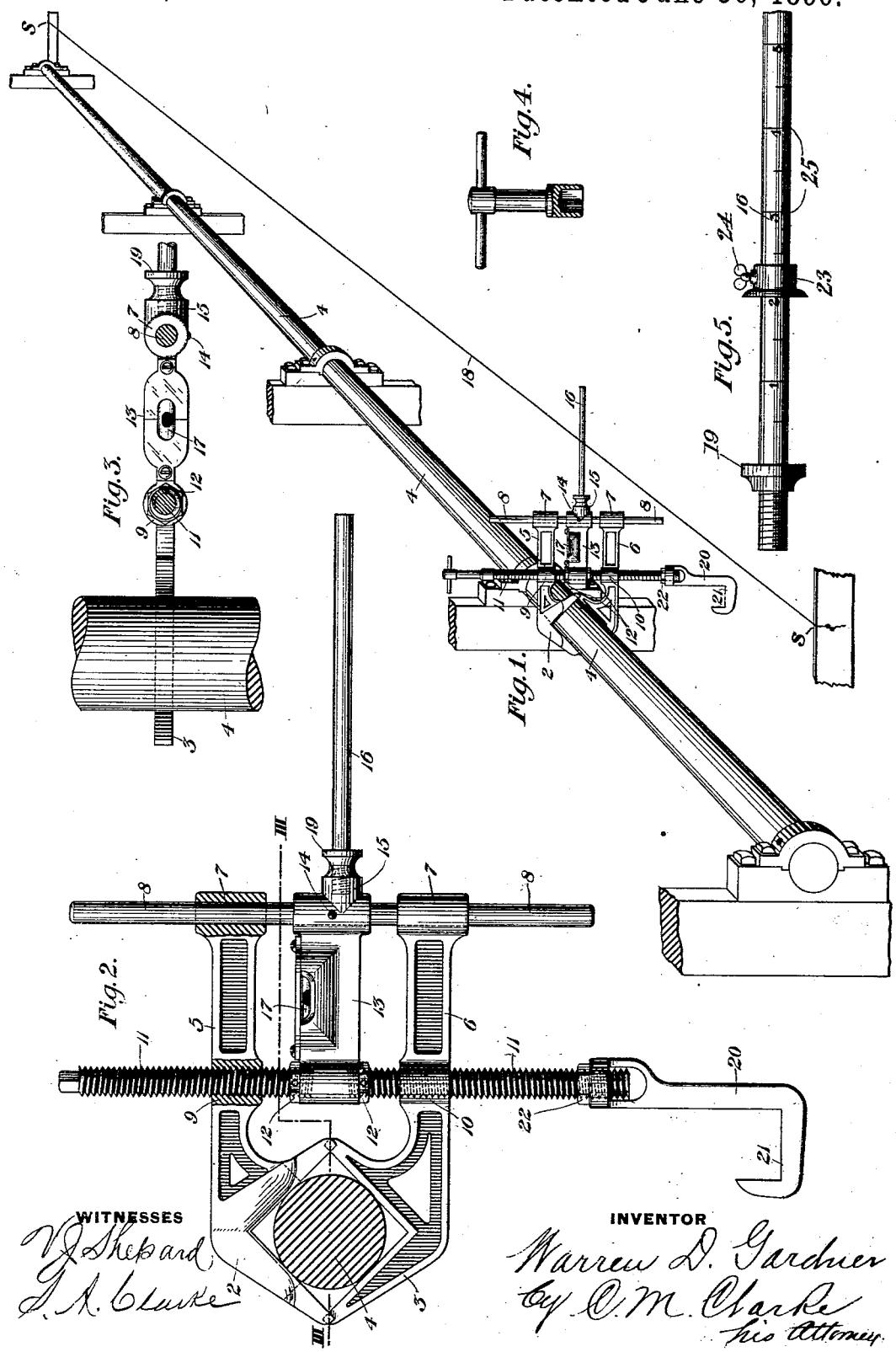

WARREN D. GARDNER, OF OSWEGO, NEW YORK.

SHAFT-LINER.

SPECIFICATION forming part of Letters Patent No. 563,226, dated June 30, 1896.

Application filed December 28, 1895. Serial No. 573,682. (No model.)

*To all whom it may concern:*

Be it known that I, WARREN D. GARDNER, a citizen of the United States, residing at Oswego, in the county of Oswego and State of New York, have invented or discovered a new and useful Improvement in Shaft-Liners, of which the following is a full, clear, and exact description, reference being had to the accompanying drawings, forming part of this application, in which—

Figure 1 is a view in perspective showing my improved shaft-liner applied to a shaft. Fig. 2 is a side elevation, on an enlarged scale, partly in section, showing the device clamped on a shaft. Fig. 3 is a horizontal sectional view taken on the line III III of Fig. 2. Fig. 4 is a detail view of the adjusting-key. Fig. 5 is a detail view of a gaging device for setting the line.

Similar numerals of reference refer to like parts wherever used throughout this specification.

My invention relates to instruments for lining up or leveling shafting, so as to secure such shafting in position with relation to other shafting already in position, or in relation to the walls of the building, so that it shall be true, level, and horizontal, and my device is designed to assist in such work, so that it may be performed in a more rapid, accurate, and satisfactory manner than heretofore.

It comprises a pair of clamps 2 3, the jaws of which are arranged in equal angles, so that when closed upon a shaft 4, as shown in Figs. 1 and 2, the rest of the mechanism secured to the clamps will be rigidly held in position in relation to such shaft. The points of the clamps are made to interfit, so as to permit of closing on a shaft of comparatively small diameter. The clamps are provided with lateral extensions 5 6, having at their ends vertical slide-bearings 7 for a vertical guide-shaft 8, and between the clamps and such bearings are internally right and left hand threaded enlargments 9 10, in which is a vertical similarly right and left hand threaded temper-screw 11, secured to the center of which by means of nuts 12 is the spirit-level support 13, the screw being free to rotate therein, the spirit-level support being also secured at 14 to the vertical guide-shaft 8. Projecting from the outer end is a boss 15, into which is screwed a line-indicator 16 the top of which corresponds, when the instrument is level, to the center line of the shaft 4. When, by turning the temper-screw 11 by the handle shown in Fig. 4, the clamps 2 3 are caused to approach or separate from each other, the center piece 13 and the rod 16 will maintain their relation to the center of the shaft 4 by reason of the equal feed of the screw in the bearings 9 10. Mounted in the upper part of the center piece 13 is a spirit-level 17; the object of which is to determine accurately when the rod 16 is level with the center of the shaft 4.

When it is desired to use the instrument to straighten a shaft which for any reason is out of line, a line 18 is stretched taut on a level with the shaft 4 and secured at its ends to supports *s s*, equidistant from the center of the shaft. Now, if the instrument is clamped around the shaft at any point, as for instance beside one of the bearings, the position of the line 18 on the rod 16 will indicate whether the center of the shaft is too near or too far from the line, when the shaft may be adjusted until, as indicated by the rod 16, the distance from the center of the shaft to the line will correspond to the distance from the center of the shaft to the support *s*. By loosening the clamps and sliding the instrument along the shaft and retightening, or by applying it to the shaft at each bearing, any inaccuracy may readily be detected and corrected.

If desirable, two instruments may be used together, clamped to the same shaft, for correcting any vertical inaccuracies, and I have provided, secured to the lower end of the temper-screw 11, brackets 20, having a receptacle 21, designed to support a leveling-rod, such brackets being secured by turning onto the threads of the temper-screw 11 and held in position by the lock-nuts 22. These brackets are used when for any reason it is desired to verify the level of the shafting to which the clamps are secured, and are not designed to be used in the ordinary application of the instrument.

I have illustrated in Fig. 5 an adjustable gage 23, which may be set by a set-screw 24 at any predetermined distance out from the shoulder 19, the rod 16 being supplied with measuring-divisions 25, thus assisting in the accurate location of the shaft 4 by setting such gage 23 against the line.

If desired, the rod 16 may be made of considerably-greater length than shown in the drawings, according to the distance desired, such rod being easily unscrewed from the boss 15, thus facilitating compact packing of the instrument.

The advantages of my invention will be appreciated by machinists and others accustomed to locating shafting, inasmuch as it affords an accurate and rapid means of straightening and adjusting various lines of shafting with relation to a horizontal or vertical plane or to each other. It is simple, strong, and durable in its construction, not liable to get out of order, and capable of giving in practice most satisfactory results, while effecting a saving in time.

Changes and modifications may be made in my invention without departing from it, as I do not desire to be limited to the exact form of construction shown in the drawings, but to include any mechanical equivalent thereof.

Having described my invention and in what manner it operates, what I claim, and desire to secure by Letters Patent, is—

1. In combination with a pair of interfitting equal-angled clamps oppositely arranged, and provided with lateral extensions, a right and left hand threaded temper-screw engaging the lateral extensions and designed to separate or close the clamps, a vertical guide-rod passing through slide-bearings in the ends of the extensions, a connecting spirit-level support, supplied with a spirit-level, secured to the temper-screw and the guide-rod respectively; a graduated line-rod screwed into the end of the spirit-level support, at right angles to the temper-screw and to the guide-rod respectively, provided with an adjustable stop set to move on the graduated line-rod, substantially as set forth.

2. In combination with the right and left hand threaded temper-screw 11, the vertical guide-rod 8, and the connecting-support 13 supplied with a spirit-level, secured to the temper-screw and the guide-rod; the upper and lower horizontal members 5, 6, screw-threaded on the temper-screw, and having a slide-bearing on the guide-rod, provided at their ends with V-shaped, interfitting upper and lower clamps 2, 3, substantially as set forth.

In testimony whereof I have hereunto set my hand this 4th day of December, 1895.

WARREN D. GARDNER.

Witnesses:
W. H. BULLOCK,
A. P. MURDOCH.